United States Patent [19]

Campbell

[11] 4,422,348

[45] Dec. 27, 1983

[54] CONNECTING ROD

[75] Inventor: Gary L. Campbell, Waterloo, Iowa

[73] Assignee: Deere & Company, Moline, Ill.

[21] Appl. No.: 423,756

[22] Filed: Sep. 27, 1982

[51] Int. Cl.³ .............................................. G05G 1/00
[52] U.S. Cl. .................................. 74/579 E; 403/344
[58] Field of Search .................... 74/579 E, 579 R; 403/344, 13

[56] References Cited

U.S. PATENT DOCUMENTS 2,145,864 2/1939 Denneen et al. .............. 74/579 UX
3,361,007 1/1968 Belsauti et al. ............... 74/579 E X

FOREIGN PATENT DOCUMENTS 864172 1/1953 Fed. Rep. of Germany .... 74/579 E

OTHER PUBLICATIONS

"Fundamentals of Service–Engines", Deere & Co., 1968, pp. 2-47.

Primary Examiner—Andrew V. Kundrat

[57] ABSTRACT

A connecting rod has a cap, a head and a shank. The cap and head are joined together by a pair of tongue and groove connections. One connection is a press-fit connection, while the other connection is a snap-fit connection.

1 Claim, 1 Drawing Figure

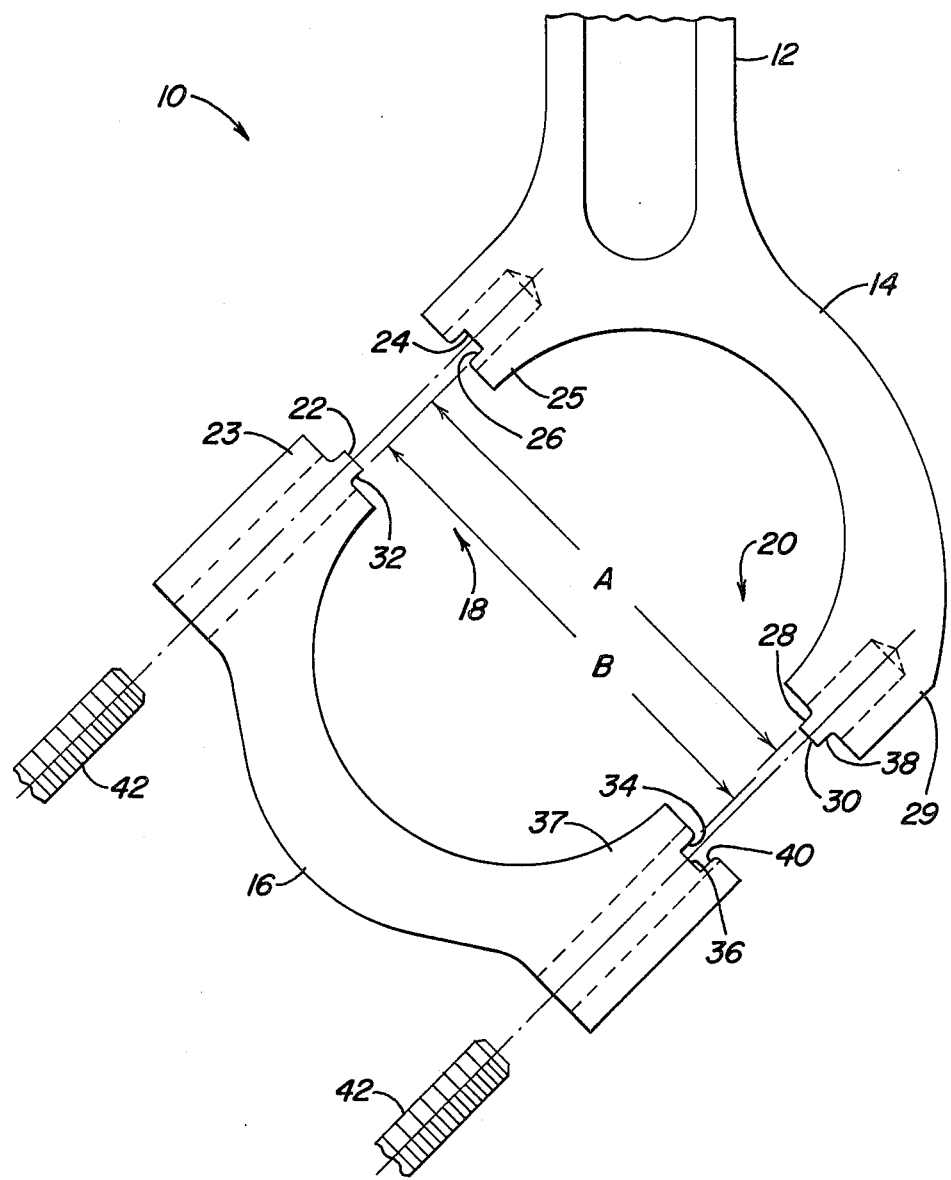

CONNECTING ROD

BACKGROUND OF THE INVENTION

The present invention relates to a connecting rod with tongue and groove joints between its head and cap.

It is known to join a connecting rod cap to its head via tongue and groove connections in order to prevent joint slippage and screw bending. In a known connecting rod, the tongue and groove joint nearest the shank is a press-fit joint while the other joint is a slip-fit joint. This slip joint does not positively locate the cap with respect to the rod and therefore, shifting or misalignment along the joint split line and cap twisting during bolt tightening can occur. This joint shifting may cause high loading on rod bearings and an out-of-round bearing bore, both of which contribute to increased wear and reduced durability. Similarly, if the cap twists relative to the head during assembly, then clearance between the connecting rod and the crankshaft can be lost with the resulting possibility of engine seizure.

SUMMARY OF THE INVENTION

An object of the present invention is to provide a connecting rod with a head-cap joint which resists misalignment and twisting of the cap.

These and other object are achieved by the present invention wherein a connecting rod has a cap joined to its head via a pair of tongue and groove connections. The connection nearest the rod shank is a press-fit connection. The other connection is a snap-fit connection.

BRIEF DESCRIPTION OF THE DRAWING

The FIGURE is a view of a connecting rod constructed according to the present invention.

DETAILED DESCRIPTION

A connecting rod 10 includes a shank 12, a head 14 and a cap 16. The head 14 and cap 16 are joined together at 18 and 20 to enclose two split bearing halves (not shown). The joint 18 nearest the shank 12 is formed by a tongue or tab 22 which projects from arm 23 of the cap 16 and is press-fitted into a corresponding groove 24 in arm 25 of the head 14.

However, instead of the conventional loose tongue and groove connection at the far connection 20, the present invention provides for a snap-fit connection. This snap-fit is achieved by making the distance "A" between surface 26 of groove 24 and surface 28 of tab 30 of arm 29 of head 14 slightly smaller than the distance "B" between surface 32 of tab 22 and surface 34 of groove 36 in arm 37 of cap 16. At the same time, the width of groove 36 is made slightly larger than the width of tab 30 so that there is no interference between surfaces 38 and 40 of tab 30 and groove 36, respectively.

Thus, to join the cap 16 to the head 14, the cap 16 is first loosely located with respect to the head 14 by known spring dowel rings (not shown) which encircle the bolts 42. Then, tab 22 is press-fitted into groove 24 to make the near connection 18. Then, the far connection 20 is made by snap-fitting surfaces 28 and 34 together so that tab 30 is received by groove 36. When this is accomplished, the head 14 and cap 16 will be under slight expansive and compressive tension, respectively. Thus, the cap 16 is positively located with respect to head 14 by metal-to-metal engagements at both the near and far connections 18 and 20, while excessive interference, which could hinder positive seating of the cap 16 to the head 14, is avoided.

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

What is claimed is:

1. In a connecting rod having a shank, a head and a cap joined to the head by a pair of tongue and groove connections, the improvement wherein one of the connections is comprised of a press-fit connection and the other connection is comprised of a snap-fit connection, the connection farthest from the shank being the snap-fit connection, the head having first and second arms, an end of the first arm being nearer the shank than an end of the second arm, the end of the first arm having a groove which receives in a press-fit manner a tongue which extends from a corresponding first arm of the cap, the end of the second arm having a tongue extending therefrom for insertion into a corresponding groove in a corresponding second arm of the cap, the groove in the second cap arm having a width which is greater than the width of the tongue of the second head arm, the groove and tongue of the cap having a separation which is greater than the separation of the groove and tongue of the head.

* * * * *